United States Patent
Grochowski et al.

(10) Patent No.: US 10,061,804 B2
(45) Date of Patent: *Aug. 28, 2018

(54) OPTIMIZING AN ORDER OF EXECUTION OF MULTIPLE JOIN OPERATIONS

(71) Applicant: International Business Machines Corporation, Armonk, NY (US)

(72) Inventors: Marek Grochowski, Cracow (PL); Artur M. Gruszecki, Cracow (PL); Tomasz Kazalski, Cracow (PL); Grzegorz S. Milka, Cracow (PL); Konrad K. Skibski, Cracow (PL); Tomasz Stradomski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/796,980

(22) Filed: Oct. 30, 2017

(65) Prior Publication Data

US 2018/0046674 A1 Feb. 15, 2018

Related U.S. Application Data

(63) Continuation of application No. 14/076,598, filed on Nov. 11, 2013, now Pat. No. 9,852,181.

(30) Foreign Application Priority Data

Dec. 4, 2012 (GB) .................................. 1221783.2

(51) Int. Cl.
*G06F 7/00* (2006.01)
*G06F 17/30* (2006.01)

(52) U.S. Cl.
CPC .. *G06F 17/30466* (2013.01); *G06F 17/30442* (2013.01)

(58) Field of Classification Search
CPC .......... G06F 17/30286; G06F 17/30442; G06F 17/30483; G06F 17/30545;
(Continued)

(56) References Cited

U.S. PATENT DOCUMENTS 5,511,190 A * 4/1996 Sharma ............. G06F 17/30489
5,761,653 A 6/1998 Schiefer
(Continued)

OTHER PUBLICATIONS

D. Gunopulos et al., "Approximating Multi-Dimensional Aggregate Range Queries Over Real Attributes", Proceedings of the International Conference on Management of Data, ACM, 2000, pp. 463-474.

(Continued)

*Primary Examiner* — Tony Mahmoudi
*Assistant Examiner* — Linh Black
(74) *Attorney, Agent, or Firm* — Law Office of Jim Boice

(57) ABSTRACT

A computer-implemented method, system, and/or computer program product optimizes an order of execution of column join operations. A first partitioning of the first data column splits the first data column into first subsets of rows. A second partitioning of the second data column splits the second data column into a second subsets of rows. Cardinalities of sub-tables derived by a respective joining of the subsets of rows of the first and second data columns are estimated, based on the first and second value frequency information. An order of execution of multiple join operations is then optimized based on the estimated cardinalities of the sub-tables.

18 Claims, 3 Drawing Sheets

(58) Field of Classification Search
CPC ......... G06F 17/30463; G06F 17/30486; G06F 17/30536; G06F 17/30949; G06N 99/005
USPC .................................. 707/713–714, 718–722
See application file for complete search history.

(56) References Cited

U.S. PATENT DOCUMENTS

| | | | |
|---|---|---|---|
| 5,864,842 | A | 1/1999 | Pederson |
| 6,092,062 | A | 1/2000 | Lohman |
| 6,263,334 | B1 | 7/2001 | Fayyad et al. |
| 6,272,487 | B1 | 8/2001 | Beavin et al. |
| 6,327,587 | B1 * | 12/2001 | Forster .............. G06F 17/30457 |
| 6,353,826 | B1 * | 3/2002 | Seputis ............. G06F 17/30463 |
| 6,691,099 | B1 | 2/2004 | Mozes |
| 6,865,567 | B1 | 3/2005 | Dommen et al. |
| 7,299,226 | B2 | 11/2007 | Bruno et al. |
| 7,478,083 | B2 | 1/2009 | Corvinelli et al. |
| 7,512,574 | B2 | 3/2009 | Haas et al. |
| 7,577,667 | B2 | 8/2009 | Hinshaw et al. |
| 7,636,707 | B2 | 12/2009 | Chaudhuri et al. |
| 7,685,098 | B2 | 3/2010 | Przywara |
| 7,707,005 | B2 | 4/2010 | Fraser et al. |
| 7,747,609 | B1 * | 6/2010 | Au ..................... G06F 17/30486 707/714 |
| 7,877,374 | B2 | 1/2011 | Zabback et al. |
| 7,917,502 | B2 | 3/2011 | Cheng et al. |
| 7,937,385 | B2 | 5/2011 | Bestgen et al. |
| 7,941,424 | B2 | 5/2011 | Xu et al. |
| 7,984,024 | B2 | 7/2011 | Bossman et al. |
| 8,078,610 | B2 | 12/2011 | Molini |
| 8,190,598 | B2 * | 5/2012 | Al-Omari ......... G06F 17/30445 707/718 |
| 8,396,862 | B2 * | 3/2013 | Sinclair ............. G06F 17/30474 707/714 |
| 8,549,004 | B2 | 10/2013 | Lakshminarayan et al. |
| 8,775,441 | B2 | 7/2014 | Anderson |
| 8,972,378 | B2 * | 3/2015 | Halverson ......... G06F 17/30289 707/713 |
| 9,251,204 | B2 * | 2/2016 | Collins ............. G06F 17/30442 |
| 2001/0022581 | A1 | 9/2001 | Koyama et al. |
| 2003/0135485 | A1 | 7/2003 | Leslie |
| 2004/0236722 | A1 | 11/2004 | Waas et al. |
| 2004/0260675 | A1 | 12/2004 | Bruno et al. |
| 2006/0064359 | A1 | 3/2006 | Piccionelli et al. |
| 2006/0085592 | A1 | 4/2006 | Ganguly et al. |
| 2006/0218123 | A1 | 9/2006 | Chowdhuri |
| 2008/0306903 | A1 | 12/2008 | Larson et al. |
| 2009/0024568 | A1 | 1/2009 | Al-Omari et al. |
| 2009/0248617 | A1 | 10/2009 | Molini |
| 2010/0049722 | A1 | 2/2010 | Xu et al. |
| 2011/0055201 | A1 | 3/2011 | Burger |
| 2011/0093499 | A1 | 4/2011 | Zhou et al. |
| 2011/0213776 | A1 | 9/2011 | Hong |
| 2011/0252020 | A1 | 10/2011 | Lim et al. |
| 2012/0084287 | A1 | 4/2012 | Lakshminarayan et al. |
| 2012/0117055 | A1 | 5/2012 | Al-Omari et al. |
| 2012/0117056 | A1 | 5/2012 | Al-Omari et al. |
| 2012/0197686 | A1 | 8/2012 | Fauser |
| 2013/0166557 | A1 | 6/2013 | Fricke et al. |
| 2013/0198165 | A1 | 8/2013 | Cheng |
| 2014/0153787 | A1 | 6/2014 | Schmidtler et al. |
| 2014/0153830 | A1 | 6/2014 | Amtrup et al. |
| 2014/0156635 | A1 | 6/2014 | Grochowski et al. |
| 2014/0229387 | A1 | 8/2014 | Chow |

OTHER PUBLICATIONS

D. Fuchs, "Compressed Histograms With Arbitrary Bucket Layouts for Selectivity Estimation", Information Sciences, vol. 177, Issue 3, Feb. 2007, pp. 1-26.

F. Yan et al. "Selectivity Estimation Using Orthogonal Series", Database Systems for Advanced Application, 2003, Proceedings, Eighth International Conference on, Mar. 2003, pp. 157-164.

F. Yan et al., "Selectivity Estimation of Range Queries Based on Data Density Approximation Via Cosine Series", Data and Knowledge Engineering Journal, vol. 63, Issue 3, Dec. 2007, pp. 855-878 (Abstract Only).

S. Chaudhuri et al., "Robust Cardinality and Cost Estimation for Skyline Operator", Proceedings of the 22nd International Conference on Data Engineering, 2006, pp. 1-10.

R. Jampani et al., "The Monte Carlo Database System: Stochastic Analysis Close to the Data", Transactions on Database Systems, ACM, Vol. 36, Issue 3, August 2011, Article 18, pp. 18:1-18:41.

F. Korn et al., "Range Selectivity Estimation for Continuous Attributes", Eleventh International Conference on Scientific and Statistical Database Management, Aug. 1999, pp. 1-10.

B. Oommen et al., "Query Result Size Estimation Using a Novel Histogram-Like Technique: The Rectangular Attribute Cardinality Map", Database Engineering and Applications, International Symposium Proceedings, Aug. 1999, pp. 1-13.

Y. Wu et al., "Spatial Distance Join Query Estimation Without Data Access", IEEE, International Conference on Computer Science and Automation Engineering, vol. 2, 2011, pp. 228-232.

A. Konig, "Query Estimation Techniques in Database Systems", Dissertation, University of Saarlandes, Dec. 2001, pp. 1-100.

U. Srivastava et al., "Isomer: Consistent Histogram Construction Using Query Feedback", Proceedings of the 22nd International Conference on Data Engineering, Apr. 2006, pp. 1-12.

GB Patent Application No. 1221234.6—Examination Opinion dated Apr. 17, 2013.

GB Patent Application No. 1221783.2—UK IPO Search Report dated May 24, 2013.

Chen et al., "Scheduling and Processor Allocation for Parallel Execution of Multi-Join Queries", Proceedings of the 8th International Conference on Data Engineering, IEEE Computer Society, Washingon DC, USA, Feb. 1992, pp. 58-67.

P. Furtado, "A Survey on Parallel and Distributed Data Warehouses", International Journal of Data Warehousing and Mining, IGI Publishing, vol. 5, No. 2, Apr.-Jun. 2009, pp. 148-169.

N. Bruno, "Automatic Management of Statistics on Query Expressions in Relational Databases", Ph.D. Thesis Proposal, Dept. of Computer Science, Columbia University, New York, NY, Apr. 25, 2002, pp. 1-36.

Xu et al., "Handling Data Skew in Parallel Joins in Shared-Nothing Systems", SIGMOD'08, Proceedings of, ACM, Jun. 2008, pp. 1043-1052.

U.S. Appl. No. 14/053,056 Non-Final Office Action dated Sep. 30, 2015.

U.S. Appl. No. 14/076,598 Non-Final Office Action dated Sep. 30, 2015.

U.S. Appl. No. 14/076,598 Final Office Action dated Jun. 13, 2016.

U.S. Appl. No. 14/076,598 Non-Final Office Action dated May 19, 2017.

List of IBM Patents or Patent Applications Treated As Related. Oct. 26, 2017.

* cited by examiner

OPTIMIZING AN ORDER OF EXECUTION OF MULTIPLE JOIN OPERATIONS

This application is based on and claims the benefit of priority from United Kingdom (GB) Patent Application 1221783.2, filed on Dec. 4, 2012, and herein incorporated by reference in its entirety.

BACKGROUND

The present invention relates generally to the field of database systems. More specifically, the present invention is related to a method and system for optimizing the order of execution of multiple join operations.

Relational databases systems allow a database user to enter queries into the database and return the data that meets the conditions of the query. The data present within the database system is in one or more tables or relations. Each relation consists of a number of records or tuples containing specific information possibly grouped in some ordered sequence. Each tuple consists of one or more fields called attributes. In any single attribute of a tuple there can be only a single value. However, each tuple can have a different value for the same attribute.

Some characteristics of a database relation are typically maintained. For example, the database system may maintain the cardinality, the density and the number of distinct values of each relation. Cardinality is the number of tuples or records in a table, especially the number of rows of a table. The number of distinct values is the number of distinct values of a given attribute or set of attributes. The density is the average number of tuples per distinct value.

SUMMARY

A computer-implemented method, system, and/or computer program product optimizes an order of execution of multiple join operations of a first data column and a second data column in a database system having multiple processing units. A first partitioning of the first data column splits the first data column into first subsets of rows. A second partitioning of the second data column splits the second data column into a plurality of second subsets of rows. Cardinalities of sub-tables derived by a respective joining of the subsets of rows of the first and second data columns are estimated. An order of execution of multiple join operations is then optimized based on the estimated cardinalities of the sub-tables.

BRIEF DESCRIPTION OF THE SEVERAL VIEWS OF THE DRAWINGS

In the following, preferred embodiments of the invention will be described in greater detail by way of example, only making reference to the drawings in which.

DETAILED DESCRIPTION

Figure 1:
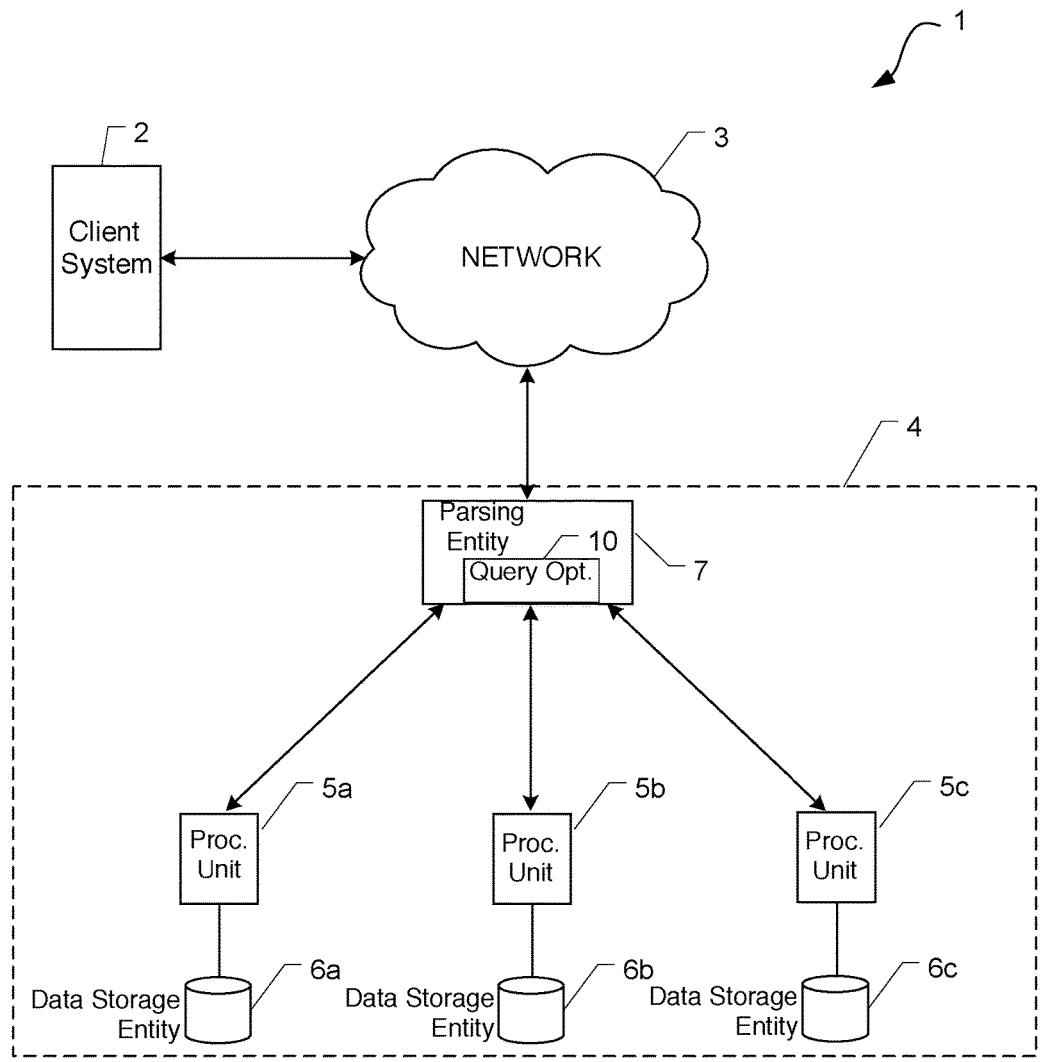
FIG. 1 shows schematic representation of an exemplary architecture for a MPP database system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodies therein, for example, in baseband or as part of a carrier wave. Such a propagated signal may take any of a variety of forms, including, but not limited to, electro-magnetic, optical, or any other suitable combination thereof. A computer readable signal medium may be a computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented program language such as Java, Smalltalk, C++ or the like and conventional procedural programming languages, such as the "C" programming language or similar programming languages. The program code may execute entirely on the user's computer, partly on the user's computer or entirely on the remote computer or server. In the latter scenario, the remote computer may be connected to the user's computer through any type of network, including local area network (LAN) or a wide area network (WAN), or the connection may be made to an external computer (for example, through the Internet using an Internet Service Provider).

One operation performed by a database system is known as a join operation. A join operation is used to combine related tuples from two relations into single tuples. Typically, the join operation matches tuples from two relations on the values taken from each relation on a common attribute and creates a joined table or relation. If another relation needs to be joined with the result relation, the result relation may be referred to as an intermediate relation because it is created in the process of generating a result relation.

A query entered into a relational database system may result in multiple operations being performed. In many cases, the operations of the query can be performed in several different orders without changing the result of the query. Each possible order of operations is referred to as a query execution plan. There may be several alternative query execution plans, each specifying a set of operations to be executed by the database system. Each different query execution plan will have a different resource usage, i.e. processing time, memory usage etc.

Relational database systems typically include a component called a query optimizer. The query optimizer may identify several query execution plans, estimate the cost of each different query execution plan, and select the plan with the lowest estimated resource usage for execution. Query plans generated for a query will differ in their resource usage of obtaining the desired data. The query optimizer evaluates these resource usage estimates for each query plan in order to determine which plan is likely to have the lowest resource usage.

The join operation can be quite expensive, since joining together two or more entire relations can result in a very large relation. When multiple join operations are present in a query, the resource usage of a bad execution plan may increase dramatically. It is important for the query optimizer to identify a query execution plan that minimizes resource usage. The order of multiple joins chosen by the query optimizer is often a key factor in the ultimate resource usage of the query execution plan.

In case of massive parallel processing (MPP) environment, i.e. a computing environment comprising multiple processing units for handling e.g. queries, one of the important factor in optimizing the query execution plan is distribution of the data among all processing units. During the execution of the query, the distribution of data to the respective processing units may be changed. Especially performing multiple join operations, data may be redistributed to the respective processing units several times during one query execution.

Such redistribution of the data between processing units during query execution may lead to an intermediate data skew, i.e. at least one processing unit got significantly more data than other processing units. The significant mismatch of workload of the processing units leads to an increased time to finish whole query execution because all other processing units has to wait until the overloaded processing unit has finished processing.

Therefore, it would be advantageous to have a mechanism for estimating the workload of each processing unit and optimize the order of execution of multiple join operations in order to avoid intermediate data skew.

Referring to FIG. 1, a schematic representation of an exemplary architecture for a large database system 1 is shown. The database system 1 includes a database management system (DBMS) built upon a massively parallel processing (MPP) system 4.

As shown, the database system 1 comprises at least one client system 2 which is connected via network 3 to the MPP system 4. The MPP system 4 comprises multiple processing units 5a-5c that manage the storage and retrieval of data in data-storage entities 6a-6c. Each of the processing units 5a-5c manages a portion of a database that is stored in the corresponding data-storage entity 6a-6c. Each of the data-storage entities 6a-6c includes one or more disk drives or other storage media.

The MPP system 4 stores data in one or more tables in the data-storage entities 6a-6c. To ensure an evenly distributed workload, the tables are partitioned in several subsets of rows wherein each subset of data is stored within a particular data-storage entity 6a-6c and therefore is associated with a particular processing unit 5a-5c.

A parsing entity 7 organizes the storage of data and the distribution of data among the processing units 5a-5c, respectively, the data-storage entities 6a-6c. The parsing entity 7 also coordinates the retrieval of data from the data-storage entities 6a-6c in response to queries received from the client computer system 2 connected to the MPP system 4 through the network connection 3.

A request entered into the relational database system 1 may result in multiple operations being performed. Especially multiple join operations can be performed in several different orders without changing the result of the query, but the execution order may affect the query performance in a tremendous way. Therefore the relational database system 1 may comprise a component for optimizing multiple join operations, called query optimizer 10, to determine the proper order of the join operations which leads to an optimal usage of system resources of the MPP system 4.

In MPP systems 4 an important factor to be optimized by the query optimizer 10 is the distribution of data among the available processing units 5a-5c in such way that the join operations performed by the particular processing units 5a-5c provide sub-tables with a low spread of cardinality, i.e. there is no significant variance in the number of rows of the particular sub-tables. Thereby it may be avoided that an overloaded processing unit needs much more time for processing the join-operation, whereas the other processing units have to wait until the overloaded one has finished processing the operation.

So, one of the most important information for optimizing the order of execution of a multiple join operation in an MPP system 4 is to estimate the number of rows, i.e. the cardinality of the resulting sub-table derived by joining a subset of rows of a first data column with a subset of rows of a second data column, hereinafter also referred to as joined sub-table. The number of rows of a joined sub-table is basically affected by the spread of data within the subsets of rows, i.e. the number or frequency of distinct attribute values within the respective subset of rows.

For estimating the cardinality (i.e., the number of tuples or records in a table, especially the number of rows of a table) of the joined sub-tables, a set of value frequency information is provided. A first set of value frequency information is correlated with the first data column being involved in join-operation and provides information about the data of the subsets of rows of the first data column processed within each processing unit. Preferably, the first set of value frequency information indicates the frequency of attribute values of the subsets of rows of the first data column processed within each processing unit.

Similarly, a second set of value frequency information is correlated with the second data column being involved in join-operation and provides information about the data of the subsets of rows of the second data column processed within each processing unit 5a-5c. The second set of value frequency information indicates the frequency of attribute values of the subsets of rows of the second data column processed within each processing unit 5a-5c. In other words, value frequency information is provided for each data column being involved in join-operation and for each processing unit of the MPP system 4 to enable the determination of spread of attribute values of each data column on the respective processing units.

For example, a first table comprises at least a first data column and a second table comprises at least a second data column. When partitioning the tables on a MPP system 4 comprising three processing units 5a-5c, respectively three data-storage entities 6a-6c, the first and second data column will be split in three subsets of rows, wherein each subset of rows of the first and second data column will be processed by a different processing unit 5a-5c. Each processing unit will be correlated with first and second value frequency information indicating the spread of attribute values of the first, respectively, the second data column on the respective processing unit.

The value frequency information indicating the spread of attribute values within each subset of rows of the first and second data column may be derived by building regular histograms for each subset of rows. Preferably the statistical information is derived by using a query feedback based algorithm, wherein prior processed queries are used to interpolate the spread of data by means of an algebraic function.

In the following, the generation of the algebraic function, hereinafter also referred to as density distribution function, is explained in detail, wherein the subset of rows of the first data column is represented by R and the subset of rows of the second data column is represented by S. The joined sub-table which is the result of the JOIN-operation based on R and S is denoted by T.

The cardinality, i.e. the number of rows of a joined sub-table T may be estimated based on density distribution functions $f(x)$, $g(x)$, wherein the first density distribution functions $f(x)$ is representing the spread of data within the subset of rows of the first data column R and the second density distribution functions $g(x)$ is representing the spread of data within the subset of rows of the second data column S. Preferably, the density distribution functions $f(x)$, $g(x)$ are integrable functions on the whole domain of possible values. Assuming the density function $f(x)$ has been already defined, obtaining the exact number of rows of the correlated subset of rows of the first data column R meeting a certain criteria, e.g. $x_{min} < x < x_{max}$ can be calculated by integrating $f(x)$:

$$\int_{Xmin}^{Xmax} f(x)dx; \quad \text{(formula 1)}$$

Approximated density distribution functions $f(x)$, $g(x)$ can be derived by using a query feedback based algorithm. At the beginning it is assumed that the data are evenly spread across all values between $x_{min}$ and $x_{max}$. So, at the beginning $f(x)$ is represented by a constant value, which can be calculated by:

$$f(x) = \frac{\text{total number of rows in the subset}}{|x_{max} - x_{min}|} = const.; \quad \text{(formula 2)}$$

After execution of a query based on the subset of rows of the first data column R, i.e. select . . . from R where attribute<value1 (value1∈$[x_{min};x_{max}]$), an information about the exact number of rows k contained within the range x<value1 can be deduced. So, the density distribution functions $f(x)$ is evaluated by resolving the following equation (assuming the linear independence of the sub-equations):

$$\begin{cases} \int_{Xmin}^{Xmax} f(x)dx = \text{total number of rows in the subset} \\ \int_{Xmin}^{value 1} f(x)dx = k \end{cases} \quad \text{(formula 3)}$$

Using the query feedback algorithm, each time a new query is executed, a new condition is added to the equation defining the density distribution. In a generalized way, the formula can be written as:

$$\begin{cases} \int_{x_0^0}^{x_1^0} f(x) = k_0 \\ \int_{x_0^1}^{x_1^1} f(x) = k_1; M \in N \\ \dots \\ \int_{x_0^{M-1}}^{x_1^{M-1}} f(x) = k_{M-1} \end{cases} \quad \text{(formula 4)}$$

In other words, by usage of the query feedback algorithm, single values of the exact density distribution function $f(x)$ are determined. The feedback of those values is used to gather and—preferably—improve the density distribution function $f(x)$. To derive an integrable function needed for calculating the number of rows (cf. formula 1), the exact density distribution function $f(x)$ is approximated by a polynomial with order (M−1) using M derived values. The polynomial may have the following structure:

$$f(x) = a_0 + a_1 x + a_2 x^2 + \dots + a_{M-1} x^{M-1} \quad \text{(formula 5)}$$

A person skilled in the art is able to obtain the polynomial based on the set of values M derived by using the upper mentioned query feedback algorithm.

The density distribution function $g(x)$ of the subset of rows of the second data column S is determined in the same manner by using query feedback algorithm. As a result, the number of rows containing a certain range of numerical values can be estimated by integrating the respective density distribution function $f(x)$, $g(x)$ within said range.

Coming back to the above described MPP-system 4, if density distribution functions are available for analytically characterizing the frequency of distinct attribute values processed by the respective processing units 5a-5c, upper mentioned set of value frequency information may be described as a vector of density functions:

$$(f_1, f_2, \dots f_n)_A$$

wherein: A is indicating a certain partitioning, i.e. a certain distribution of rows of the respective column within available processing units;
n is the number of processing units available in MPP-system; and
$f_i$ is the density distribution function for data processed by processing unit i;

It is worth mentioning, that the vector of density functions mainly depends on the partitioning of data within available processing units, i.e. the mapping of the subset of rows of the data column to the available processing units.

Assuming that a certain data column being part of a table comprising a plurality of data columns. The partitioning of the table, i.e. the distribution of data of the table among the available processing units $5a$-$5c$ may be performed using a certain data column as a hash key. This means that all rows with the same attribute value in the data column used as hash key will be mapped to the same processing unit. During execution of multiple join operations it may happen, that the query optimizer decides to redistribute the table using another data column as a hash key. After redistribution the value frequency information derived for the previously existing partitioning becomes worthless, because the distribution of data may have changed completely. Therefore value frequency information is provided not only for a single partitioning but also for at least several, preferably the commonly used partitionings. Therefore estimating the cardinalities of sub-tables may be possible for all frequently used partitionings.

A second aspect which influences the number of rows of a joined sub-table is the number of unique values $u_{5a}$, $u_{5b}$, $u_{5c}$ within the first and second subset of rows to be joined. The number of rows of the first and second subset of rows may be estimated by using a sample of data, by determining the number of unique values $u_{5a}$, $u_{5b}$, $u_{5c}$ within the sample of data and by extrapolating the number of unique values within the whole subset of rows by using the information gathered for the sample. Preferably, the data are sampled during query execution, i.e. the information is gathered just-in-time during query execution.

Figures 2, 3:
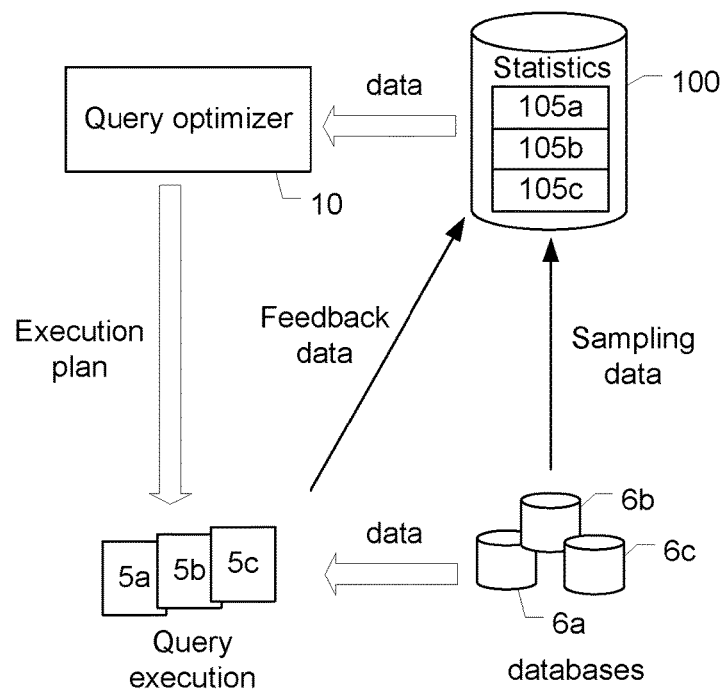
FIG. 2 shows a schematic diagram of data flow within the database system.
FIG. 3 shows a schematic representation of statistical information stored in the statistics unit.

FIG. 2 shows a schematic flow chart depicting the data flow within the database system. A statistics unit 100 is storing statistical information $105a$-$105c$ for each processing unit $5a$-$5c$. Those statistical information $105a$-$105c$ can be derived by sampling the data or by using query feedback. For example, particular statistical information $105a$-$105c$ is related to a particular processing unit $5a$-$5c$, respectively, to a particular partitioning of table data and comprises for each column of a table the number of unique values obtained by sampling the data and value frequency information obtained by using query feedback algorithm. It is also possible to store further statistical information, for example minimum and maximum values, the dispersion of data etc. The statistical information can be provided to the query optimizer 10, which preferably gathers an execution plan based on statistical information. The execution plan preferably defines the order of cascaded join-operations to optimize the query performance. Finally, the query is executed based on the execution plan provided by the query optimizer 10.

FIG. 3 shows an example of statistical information stored in the statistics unit 100. Assuming that a table containing two data columns col1, col2 with a certain number of rows is stored in a MPP-system 4 comprising three processing units $5a$-$5c$, two commonly used partitionings may be available, namely a first partitioning I using the first data column col1 as a hash key and a second partitioning II using the second data column col2 as a hash key. Therefore it may be advantageous to store statistical information for both partitionings I, II within the statistics unit 100. Each data set correlated with a certain partitioning I, II comprises two data vectors. The first data vector comprises first value frequency information $f_{5a}$, $f_{5b}$, $f_{5c}$, respectively, second value frequency information $g_{5a}$, $g_{5b}$, $g_{5c}$ for each processing unit $5a$-$5c$, the second data vector comprises the number of unique values $u_{5a}$, $u_{5b}$, $u_{5c}$ use of the subset of data processed by the particular processing unit $5a$-$5c$. As indicated above, it is also possible to store further statistical information, for example minimum and maximum values, the dispersion of data etc.

Based on said statistical information of data related to a particular processing unit it may be possible to estimate the number of rows, i.e. the cardinality of a sub-table generated by a particular processing unit $5a$-$5c$ when processing a join operation based on a first and second data column col1, col2.

In the following, several possibilities for estimating the number of rows based on upper mentioned statistical information will be disclosed in a generalized way.

Figure 4:
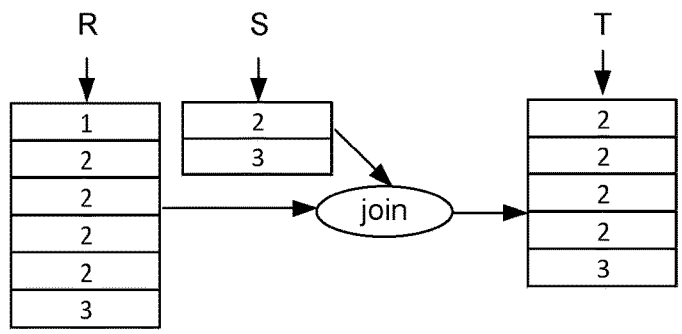
FIG. 4 shows an example of inner-join-operation.

FIG. 4 shows an example for joining first and second data column R, S by the most commonly used inner-join-operation. The resulting joined table T is also shown.

To estimate the number of rows of the joined table T by using an inner-join-operation, i.e. the resulting joined table T contains all values, which are contained in both tables to be joined, the following equation can be used:

$$F(a,b) = \sum_{i=0}^{n-1} \left( \frac{\max\left(\int_{x_i}^{x_{i+1}} f(x)dx, 0\right)}{u_1^i} * \frac{\max\left(\int_{x_i}^{x_{i+1}} g(x)dx, 0\right)}{u_2^i} \right) * \max(u_1^i, u_2^i) \quad \text{(formula 6)}$$

wherein $x_0 = a$;
$x_n = b$;
$x_i \in [a,b]$;
f(x): density distribution function of the first data column R;
g(x): density distribution function of the second data column S;
a, b: starting row and end row of the respective columns which are incorporated into the join.
$u_1^i$: number of unique values of the first data column R in the respective interval i;
$u_2^i$: number of unique values of the second data column S in the respective interval i;
F(a,b): estimated number of rows of the resulting joined table T by joining first and second data column R, S in the interval [a,b].
The first term $$\frac{\max\left(\int_{x_i}^{x_{i+1}} f(x)dx, 0\right)}{u_1^i}$$

within formula 6 represents the average number of rows per unique value in the $[x_i; x_{i+1}]$-section for the first data column R, the second term $$\frac{\max\left(\int_{x_i}^{x_{i+1}} g(x)dx, 0\right)}{u_2^i}$$

within formula 6 represents the average number of rows per unique value in the $[x_i; x_{i+1}]$-section for the second data column S. The third term max($u_1^i, u_2^i$) is for deriving the maximum value of the numbers of unique values contained in the [$x_i; x_{i+1}$]-sequences of the first and second data column.

Formula 6 can be simplified in the following way:

$$F(a, b) = \sum_{i=0}^{n-1}\left(\frac{\max\left(\int_{x_i}^{x_{i+1}} f(x)dx, 0\right)}{u_1^i} * \frac{\max\left(\int_{x_i}^{x_{i+1}} g(x)dx, 0\right)}{u_2^i}\right) * \max(u_1^i, u_2^i) =$$

$$\sum_{i=0}^{n-1}\left(\max\left(\int_{x_i}^{x_{i+1}} f(x)dx, 0\right) * \max\left(\int_{x_i}^{x_{i+1}} g(x)dx, 0\right)\right) * \frac{\max(u_1^i, u_2^i)}{u_1^i * u_2^i} =$$

$$\sum_{i=0}^{n-1} \frac{\max\left(\int_{x_i}^{x_{i+1}} f(x)dx, 0\right) * \max\left(\int_{x_i}^{x_{i+1}} g(x)dx, 0\right)}{\min(u_1^i, u_2^i)};$$

(formula 7)

According to formulas 6 and 7, the interval between the starting row a and the end row b is sub-divided in n sections or segments, wherein n is a natural number N. Preferably the sections are chosen according to the roots of the first and second density distribution function f(x), g(x), i.e. the set of $x_i$ contains at least all roots of the first and second density distribution function f(x), g(x). To adjust the accuracy of the result of the estimation of number of rows of the joined table T, i.e. to adjust the accuracy of the join estimation to the required level, the number of sections n can be adapted. For achieving a high accuracy, the number of sections n is increased. In contrary, in cases where a join estimation with a lower accuracy is acceptable, the number of sections n can be decreased.

The number of sections n can also be determined in a more sophisticated way. The differential of the density distribution function can be used to determine the stiffness of the density distribution function. Preferably the following equation could be used to determine the beginning of the next section:

$$x_i = x_{i-1} + \frac{c}{|f'(x_{i-1})|}$$ (formula 8)

wherein $x_i$=starting value of next section;
$x_{i-1}$=starting value of actual section;
c=constant over the hole domain [a, b];
f'(x)=differential of the density distribution function f(x).

The main advantage of using the stiffness of the density distribution function to determine the section grid is that regions with a high stiffness of density function are correlated with smaller sections and regions with a lower stiffness are represented by major sections.

In a similar way, the number of rows of the joined table T generated by using other types of joins, namely left-outer-join, right-outer-join and cross join may be estimated.

Figure 5:
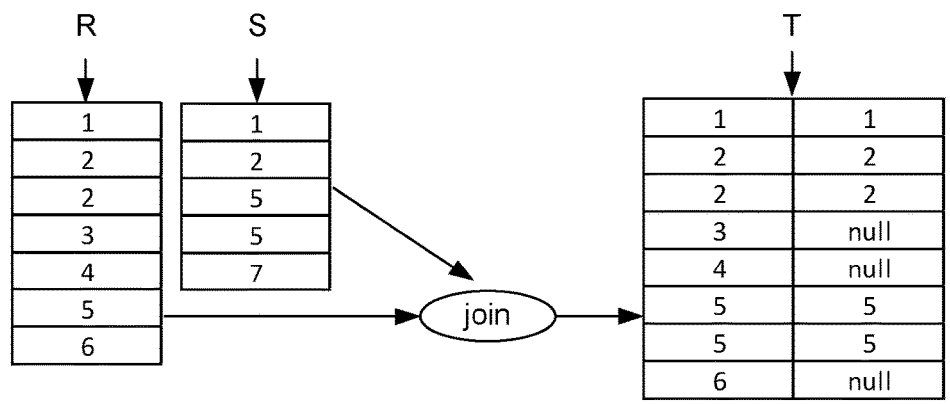
FIG. 5 shows an example of left-outer-join-operation.

Referring to FIG. 5, an example for joining first and second data column R, S by left-outer-join-operation is shown. For example, in left-outer-join-operation we have to consider intervals in which second data column S does not have rows. In other words, if there is a row with value A in first data column R, and there is no such row in second data column S, resulting joined table T will contain this row with "nulls" in the columns taken from second data column S.

To estimate the number of rows of the joined table T by using a left-outer-join-operation, the following equation can be used:

$$F(a, b) = \sum_{i=0}^{n-1}\left(\frac{\max\left(\int_{x_i}^{x_{i+1}} f(x)dx, 0\right)}{u_1^i} * \frac{\max\left(\int_{x_i}^{x_{i+1}} g(x)dx, 1\right)}{u_2^i}\right) *$$

$$\max(u_1^i, u_2^i)$$

(formula 9)

The difference between formula 9 (left-outer-join-operation case) and formula 6 (inner-join-operation case) is the value "1" instead of value "0" in the second maximum function. The reason for that are the cases where there are no rows in the second table in the respective sequence [$x_i; x_{i+1}$]. In those cases all rows from first data column R with null on the right side should be included into resulting joined table T (cf. FIG. 5).

Formula 9 can be simplified in the following way:

$$F(a, b) = \sum_{i=0}^{n-1}\left(\frac{\max\left(\int_{x_i}^{x_{i+1}} f(x)dx, 0\right)}{u_1^i} * \frac{\max\left(\int_{x_i}^{x_{i+1}} g(x)dx, 1\right)}{u_2^i}\right) * \max(u_1^i, u_2^i) =$$

$$\sum_{i=0}^{n-1}\left(\max\left(\int_{x_i}^{x_{i+1}} f(x)dx, 0\right) * \max\left(\int_{x_i}^{x_{i+1}} g(x)dx, 1\right)\right) * \frac{\max(u_1^i, u_2^i)}{u_1^i * u_2^i} =$$

$$\sum_{i=0}^{n-1} \frac{\max\left(\int_{x_i}^{x_{i+1}} f(x)dx, 0\right) * \max\left(\int_{x_i}^{x_{i+1}} g(x)dx, 1\right)}{\min(u_1^i, u_2^i)} \approx$$

$$\sum_{i=0}^{n-1} \max\left(\int_{x_i}^{x_{i+1}} f(x)dx, 0\right) * \max\left(\frac{\int_{x_i}^{x_{i+1}} g(x)dx}{\min(u_1^i, u_2^i)}, 1\right)$$

(formula 10)

The case of right-outer-join operation is similar to the left-outer-join operation in the way that we have to consider intervals in which first data column R does not have rows. In other words, if there is a row with value A in second data column S, and there is no such row in first data column R, resulting joined table T will contain this row with "nulls" in the columns taken from the first data column R.

To estimate the number of rows of the joined table T by using an right-outer-join-operation, the following equation can be used:

$$F(a, b) = \qquad \text{(formula 11)}$$
$$\sum_{i=0}^{n-1} \left( \frac{\max\left(\int_{x_i}^{x_{i+1}} f(x)dx, 1\right)}{u_1^i} * \frac{\max\left(\int_{x_i}^{x_{i+1}} g(x)dx, 0\right)}{u_2^i} \right) *$$
$$\max(u_1^i, u_2^i) =$$
$$\sum_{i=0}^{n-1} \left( \max\left(\int_{x_i}^{x_{i+1}} f(x)dx, 1\right) * \max\left(\int_{x_i}^{x_{i+1}} g(x)dx, 0\right) \right) *$$
$$\frac{\max(u_1^i, u_2^i)}{u_1^i * u_2^i} =$$
$$\sum_{i=0}^{n-1} \frac{\max\left(\int_{x_i}^{x_{i+1}} f(x)dx, 1\right) * \max\left(\int_{x_i}^{x_{i+1}} g(x)dx, 0\right)}{\min(u_1^i, u_2^i)} \approx$$
$$\sum_{i=0}^{n-1} \max\left( \frac{\int_{x_i}^{x_{i+1}} f(x)dx}{\min(u_1^i, u_2^i)}, 1 \right) * \max\left(\int_{x_i}^{x_{i+1}} g(x)dx, 0\right)$$

Comparing formula 11 with formula 10, formula 11 is the reversed image of formula 10.

Also the number of rows of a table derived by using cross-join-operations may be estimated similarly. By using the cross-join-operation, all rows of the first data column R will be joined with all rows of the second data column S. Cross-join-operation returns the Cartesian product of rows from columns in the join. In other words, it will produce rows which combine each row from the first data column R with each row from the second data column S. Therefore, the number of rows of the cross-joined table T can be estimated using the following equation:

$$F(a, b) = \qquad \text{(formula 12)}$$
$$\sum_{i=0}^{n-1} \max\left(\int_{x_i}^{x_{i+1}} f(x)dx, 0\right) * \sum_{i=0}^{m-1} \max\left(\int_{y_i}^{y_{i+1}} g(x)dx, 0\right)$$

wherein $x_0 = y_0 = a$;
$x_n = y_m = b$;
$x_i, y_i \in [a, b]$;

It is worth noting that in formulas 6, 7, 9, 10 and 11 the number of unique value $u_1, u_2 \neq 0$.

By means of FIG. 6 the usage of number of row-estimation for optimizing the order of multiple join operations will be explained.

Figure 6:
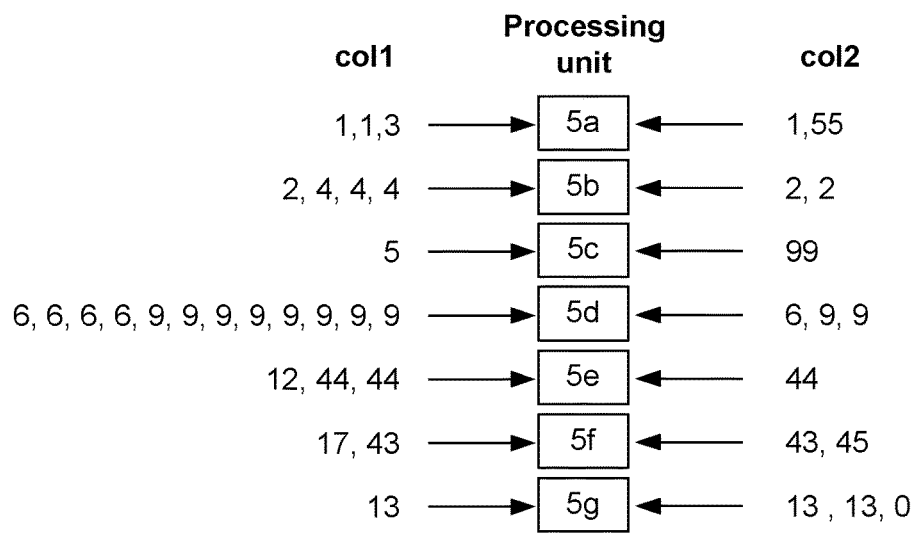
FIG. 6 shows a schematic representation of an inner-join-operation within a MPP system.

FIG. 6 shows a particular partitioning of first and second data column col1, col2 to processing units 5a-5g of a MPP-system 4. The partitioning was derived by using a certain hash key for distributing the data to the processing units 5a-5g.

Assuming an inner-join operation to be processed by each processing unit 5a-5g, e.g. the operation "SELECT from TABLE1 t1, TABLE2 t2 where t1.col1=t2.col2" each processing unit 5a-5g has to process an inner-join operation based on the assigned data. For estimating the workload of each processing unit 5a-5g in order to avoid intermediate data skew, the number of rows of the sub-tables generated by the respective processing units 5a-5g will be estimated by using the following equation:

$$F(a, b) = \frac{\max\left(\int_a^b f_i(x)dx, 0\right) * \max\left(\int_a^b g_i(x)dx, 0\right)}{\min(u_1^i, u_2^i)} \qquad \text{(formula 13)}$$

wherein f(x): density distribution function of the first data column;
g(x): density distribution function of the second data column;
a, b: starting row and end row of the respective columns which are incorporated into the join;
$u_i^1$: number of unique values of the data of the first data column which are assigned to processing unit i;
$u_i^2$: number of unique values of the data of the second data column which are assigned to processing unit i;
F(a,b): estimated number of rows of the resulting joined sub-table by joining subsets of data assigned to processing unit i.

It is worth mentioning, that the interval between the starting row a and the end row b is not sub-divided in sections or segments (cf. formula 13 vs. formula 7). Segmenting may not be necessary if there are no roots of the first and second density distribution function f(x), g(x). If necessary or favored, segmenting may be applied, i.e. formula 7 is used instead of formula 13 for estimating the number of rows of the sub-tables generated by the respective processing units.

After performing the estimation, the obtained results may be compared in order to determine the distribution of workload between the different processing units 5a-5g. Preferably the spread of estimated cardinalities of the sub-tables is evaluated. If the number of estimated rows of a sub-table being generated by a certain processing unit significantly exceeds the number of estimated rows of the sub-tables being generated by the other processing units, the distribution of workload may be unfavorable. Therefore, the actual order of join operations will be treated as worse and the order of join operations will be changed in order to archive a better distribution of workload.

According to the example of FIG. 6, processing unit 5d will be the overloaded processing unit. By using the estimation according to formula 13, the number of rows of the sub-table processed by processing unit 5d will be $$18\left(\frac{12*3}{2}\right),$$

, which significantly exceeds the number of rows of the sub-tables processed by the other processing units.

The advantage of the upper mentioned method of using statistical information related to the respective processing units 5a-5g may be even more apparent when comparing with a method using statistical information gathered on entire database level. Taking again the example of FIG. 6, an equal distribution of data to the processing units 5a-5g may be assumed, i.e. each processing unit may get 26/7≈3,7 of the rows of the first data column and 14/7=2 rows of the second data column. Taking worst case scenario into account, the attribute values of the distributed rows will be the same. Therefore the average number of rows of the joined sub-tables may be estimated as 3,7*2=7,4. Therefore the accuracy of the of the proposed method using statistical information related to the respective processing units 5a-5g is much better than using an estimation based on statistical information gathered on entire database level.

As described herein, one objective of embodiments of the invention is to provide for an improved computer-implemented method, computer-readable medium and computer system for optimizing the order of execution of multiple join operations. The objective is solved by the features of the independent and/or dependent claims. One or more embodiments are further described and claimed in the dependent claims. If not explicitly indicated otherwise, embodiments of the invention can be freely combined with each other.

In one embodiment, the present invention relates to a computer-implemented method for optimizing the order of execution of multiple join operations based on at least a first and a second data column in a database system having multiple processing units, the method comprising the following steps:
  providing at least a first partitioning of the first data column splitting the first data column in a plurality of subsets of rows, each subset of rows being correlated with a processing unit;
  providing at least a second partitioning of the second data column splitting the second data column in a plurality of subsets of rows, each subset of rows being correlated with a processing unit;
  providing at least a first value frequency information for each processing unit, the first value frequency information indicating the frequency of attribute values within the subset of rows of the first data column processed by the respective processing unit;
  providing at least a second value frequency information for each processing unit, the second value frequency information indicating the frequency of attribute values within the subset of rows of the second data column processed by the respective processing unit;
  estimating the cardinalities of sub-tables derived by the respective joining of the subset of rows of the first data column and the subset of rows of the second data column which are processed by the same processing unit, wherein the estimation of cardinalities is based on the first and second value frequency information of the respective processing unit; and
  optimizing the order of execution of multiple join operations based on the estimated cardinalities of the sub-tables.

After distributing the first and second data column, i.e. splitting the data of the first and second data column into subsets of rows, wherein each subset of rows is assigned to a particular processing unit, value frequency information for each data column and for each processing unit is provided which indicates the spread of data, i.e. the distribution of data within the respective data column. Thereby the value frequency information does not represent the distribution of data in the whole column, i.e. independent of partitioning, but represents the distribution of data restricted to a certain processing unit of the MPP system. In other words, the distribution of data is provided on a lower level of granularity, i.e. not on the level of the all rows of the respective column, but on the level of subsets of rows, that are processed by the respective processing unit. The value frequency information related to a certain processing unit and column may be used for estimating the cardinalities of sub-tables derived by joining two subsets of rows and thereby deriving information about the distribution of workload among all processing units. This information may be gathered already in the planning phase of a query to avoid intermediate data skew by using a different query execution plan, i.e. a different order of join operations.

According to one or more embodiments of the present invention, the spread of estimated cardinalities of the sub-tables is evaluated for optimizing the order of execution of multiple join operations. After estimating the cardinalities of the sub-tables generated by the processing units, the obtained results may be compared in order to determine the distribution of workload among the processing units. In case that the spread exceeds a certain level, the evaluated order of join operations may be considered disadvantageous and another order of join operations may be chosen.

According to one or more embodiments of the present invention, the first value frequency information is provided as a set of first value frequency information, said set comprising different first value frequency information, each first value frequency information being correlated with a certain partitioning of the first data column. As mentioned above, the value frequency information is provided on the level of processing units. It is worth mentioning that the subset of rows assigned to the respective processing unit mainly depends on the way of partitioning the data, i.e. distributing the data among the processing units. For enabling the estimation of number of rows for different partitionings, a set of first value frequency information is provided which covers several, preferably the most commonly used partitionings of the first data column. Similarly, a set of second value frequency information is provided which comprising different second value frequency information for several, preferably the most commonly used partitionings of the second data column.

According to one or more embodiments of the present invention, further statistical information regarding the number of unique values of data is provided in a column-separated, partitioning-separated and processing unit-separated manner. The number of unique values contained in a subset of rows of a certain column has a strong impact on the estimation of cardinality of the joined sub-table. Therefore it is advantageous to store that information in a statistics unit and take said information into account while performing the estimation. In addition, further statistical information may be stored, e.g. minimum and/or maximum values of the attribute values contained in a subset of rows of a certain column, the dispersion of attribute values etc. As previously mentioned in connection with the first and second value frequency information, also all further statistical information is provided correlated to a certain processing unit and correlated with a certain partitioning.

According to one or more embodiments of the present invention, first and second value frequency information is provided as a density distribution function describing the frequency of the attribute values within the subset of rows of the first or second data column processed by the respective processing unit. Preferably the density distribution function is a polynomial function which is derived by approximating the density distribution function based on information gathered during several previous queries.

According to one or more embodiments of the present invention, the density distribution function is provided as integrable function. Said feature may be advantageous as it is possible determine the cardinality of the joined sub-table in a simple and fast way, especially if the entity performing the estimation has implemented some basic analytical functionality.

According to one or more embodiments of the present invention, the first and second value frequency information is derived based on feedback of previously performed queries. A query-feedback based algorithm may use information of previous queries to determine the spread of data values within a certain subset of rows (depending on the partitioning of data). By using information of several previous queries, a density distribution function may be determined which is representing the spread of data values. For example, on the basis of information of several previous queries a polynomial can be deduced which is approximating the frequency of distinct values.

According to one or more embodiments of the present invention, data for generating first and second value frequency information are collected by the respective processing units. Especially when using query feedback based algorithms, the information regarding the spread of data are directly available at the respective processing units. Thereby collection of data by the processing units simplifies the process of gathering statistical data.

According to one or more embodiments of the present invention, data for generating first and second value frequency information are transmitted to a central processing unit to generate first and second value frequency information. Not only the generation of first and second value frequency information but also refreshing or updating of data requires computational effort. Therefore it may be advantageous to use a central processing unit for said generating of first and second value frequency information because the processing units handling the queries are not affected in a negative way.

According to one or more embodiments of the present invention, first and second value frequency information is stored for later reuse. Additionally, upper mentioned further statistical information may be stored for later reuse. Thereby it is possible to gather a plurality of information which can be used for improving the performance of future queries.

In a further aspect of the present invention, the invention relates to a database system having multiple processing units for parallel processing of join-operations based on at least a first and a second data column comprising means for providing at least a first partitioning of the first data column splitting the first data column in a plurality of subsets of rows, each subset of rows being correlated with a processing unit;

means for providing at least a second partitioning of the second data column splitting the second data column in a plurality of subsets of rows, each subset of rows being correlated with a processing unit;

a statistics unit for providing at least a first value frequency information for each processing unit, the first value frequency information indicating the frequency of attribute values within the subset of rows of the first data column processed by the respective processing unit;

a statistics unit for providing at least a second value frequency information for each processing unit, the second value frequency information indicating the frequency of attribute values within the subset of rows of the second data column processed by the respective processing unit;

means for estimating the cardinalities of sub-tables derived by the respective joining of the subset of rows of the first data column and the subset of rows of the second data column which are processed by the same processing unit, wherein the estimation of cardinalities is based on the first and second value frequency information of the respective processing unit; and a query optimizer adapted to optimize the order of execution of multiple join operations based on the estimated cardinalities of the sub-tables.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for optimizing an order of execution of multiple join operations based on at least a first data column and a second data column in a database system having multiple processing units, the method comprising:

providing, by one or more processors, at least a first partitioning of the first data column, wherein said at least the first partitioning splits the first data column into a plurality of first subsets of rows, each of the first subsets of rows being correlated with a distinct processing unit from the multiple processing units, wherein each of the first subsets of rows are handled by processing units that differ from one another;

providing, by one or more processors, at least a second partitioning of the second data column, wherein said at least the second partitioning splits the second data column into a plurality of second subsets of rows, each of the second subsets of rows being correlated with a distinct processing unit from the multiple processing units, wherein each of the second subsets of rows are handled by processing units that differ from one another;

estimating, by one or more processors, cardinalities of sub-tables derived by a respective joining of a subset of rows of the first data column and a subset of rows of the second data column which are processed by a same processing unit from the multiple processing units, wherein the cardinalities of the sub-tables describe a quantity of rows in the sub-tables, and wherein the cardinalities of the sub-tables derived by the respective joining of the subset of rows of the first data column and the subset of rows of the second data column are estimated according to:

$$F(a, b) = \sum_{i=0}^{n-1} \left( \frac{\max\left(\int_{x_i}^{x_{i+1}} f(x)dx, 0\right)}{u_1^i} * \frac{\max\left(\int_{x_i}^{x_{i+1}} g(x)dx, 0\right)}{u_2^i} \right) * \max(u_1^i, u_2^i)$$

where $x_0=a$;

$x_n=b$;

$x_i \in [a,b]$;

f(x) is a density distribution function of a first data column R;

g(x) is a density distribution function of a second data column S;

a, b are a starting row and end row of respective columns R and S which are incorporated into a join;

$U_1^i$ is a number of unique values of the first data column R in a respective interval i;

$U_2^i$ is a number of unique values of the second data column S in the respective interval i;

F(a,b) is an estimated number of rows of a resulting joined table T by joining the first and second data columns R, S in an interval [a,b];

$$\frac{\max\left(\int_{x_i}^{x_{i+1}} f(x)dx, 0\right)}{u_1^i}$$

represents an average number of rows per unique value in an $[x_i;x_{i+1}]$-section for the first data column R;

$$\frac{\max\left(\int_{x_i}^{x_{i+1}} g(x)dx, 0\right)}{u_2^i}$$

represents an average number of rows per unique value in the $[x_i;x_{i+1}]$-section for the second data column S; and max $(U_1^i, U_2^i)$ is used to derive a maximum value of numbers of unique values contained in $[x_i;x_{i+1}]$-sequences of the first and second data columns R, S; and optimizing, by one or more processors, an order of execution of multiple join operations based on the estimated cardinalities of the sub-tables, wherein optimizing the order of execution of the multiple join operations avoids intermediate data skew by joining sub-tables having quantities of rows that have a same value.

2. The method according to claim 1, wherein a spread of estimated cardinalities of the sub-tables is evaluated for optimizing the order of execution of multiple join operations.

3. The method according to claim 1, wherein the first value frequency information is provided as a set of first value frequency information, said set of first value frequency information comprising different first value frequency information, each first value frequency information being correlated with a certain partitioning of the first data column.

4. The method according to claim 1, further comprising:
providing, by one or more processors, at least a first value frequency information for each processing unit from the multiple processing units, the first value frequency information indicating a frequency of attribute values within the subset of rows of the first data column processed by a respective processing unit from the multiple processing units; and
providing, by one or more processors, at least a second value frequency information for each processing unit from the multiple processing units, the second value frequency information indicating a frequency of attribute values within the subset of rows of the second data column processed by the respective processing unit from the multiple processing units; wherein the second value frequency information is provided as a set of second value frequency information, the set of second value frequency information comprising different second value frequency information, each second value frequency information being correlated with a certain partitioning of the second data column.

5. The method according to claim 4, wherein different first and second value frequency information is provided for multiple, frequently used partitionings.

6. The method according to claim 1, wherein further statistical information regarding a quantity of unique values of data is provided in a column-separated, partitioning-separated and processing unit-separated manner.

7. The method according to claim 4, wherein the first value frequency information and the second value frequency information are provided as a density distribution function describing a frequency of the attribute values within the subset of rows of the first or second data column processed by the respective processing units from the multiple processing units.

8. The method according to claim 7, wherein the density distribution function is provided as an integrable function.

9. The method according to claim 4, wherein the first value frequency information and the second value frequency information are derived based on feedback of previously performed queries to the first and second data columns.

10. The method according to claim 4, wherein data for generating the first value frequency information and the second value frequency information are collected by the respective processing units from the multiple processing units.

11. The method according to claim 4, further comprising:
transmitting data for generating the first value frequency information and the second value frequency information to a central processing unit; and
generating, by the central processing unit, the first value frequency information and the second value frequency information.

12. The method according to claim 4, further comprising:
storing the first value frequency information and the second value frequency information for later reuse.

13. The method according to claim 1, wherein the cardinalities of sub-tables are estimated before starting the multiple join operations.

14. A database system having multiple processing units for parallel processing of join-operations based on at least a first and a second data column, the database system comprising:
hardware means for providing at least a first partitioning of the first data column splitting the first data column in a plurality of subsets of rows, each subset of rows being correlated with a distinct processing unit from multiple processing units, wherein each of the first subset of rows are handled by processing units that differ from one another;
hardware means for providing at least a second partitioning of the second data column splitting the second data column into a plurality of subsets of rows, each subset of rows being correlated with a distinct processing unit from the multiple processing units, wherein each of the second subsets of rows are handled by processing units that differ from one another;
hardware means for estimating the cardinalities of sub-tables derived by the respective joining of a subset of rows of the first data column and a subset of rows of the second data column which are processed by a same processing unit from the multiple processing units, wherein the cardinalities of the sub-tables describe a quantity of rows in the sub-tables, and wherein the cardinalities of the sub-tables derived by the respective joining of the subset of rows of the first data column and the subset of rows of the second data column are estimated according to:

$$F(a, b) = \sum_{i=0}^{n-1} \left( \frac{\max\left(\int_{x_i}^{x_{i+1}} f(x)dx, 0\right)}{u_1^i} * \frac{\max\left(\int_{x_i}^{x_{i+1}} g(x)dx, 0\right)}{u_2^i} \right) * \max(u_1^i, u_2^i)$$

where $x_0 = a$;
$x_n = b$;
$x_i \in [a,b]$;
f(x) is a density distribution function of a first data column R;
g(x) is a density distribution function of a second data column S;
a, b are a starting row and end row of respective columns R and S which are incorporated into a join;
$U_1^i$ is a number of unique values of the first data column R in a respective interval i;
$U_2^i$ is a number of unique values of the second data column S in the respective interval i;
F(a,b) is an estimated number of rows of a resulting joined table T by joining the first and second data columns R, S in an interval [a,b];

$$\frac{\max\left(\int_{x_i}^{x_{i+1}} f(x)dx, 0\right)}{u_1^i}$$

represents an average number of rows per unique value in an $[x_i;x_{i+1}]$-section for the first data column R;

$$\frac{\max\left(\int_{x_i}^{x_{i+1}} g(x)dx, 0\right)}{u_2^i}$$

represents an average number of rows per unique value in the $[x_i;x_{i+1}]$-section for the second data column S; and
max $(U_1^i, U_2^i)$ is used to derive a maximum value of numbers of unique values contained in $[x_i;x_{i+1}]$-sequences of the first and second data columns R, S; and
a hardware query optimizer adapted to optimize an order of execution of multiple join operations based on the estimated cardinalities of the sub-tables, wherein optimizing the order of execution of the multiple join operations avoids intermediate data skew by joining sub-tables having quantities of rows that have a same value.

15. A computer program product for optimizing an order of execution of multiple join operations based on at least a first data column and a second data column in a database system having multiple processing units, the computer program product comprising a computer readable storage medium having program code embodied therewith, the program code readable and executable by a processor to perform a method comprising:
providing at least a first partitioning of the first data column, wherein said at least the first partitioning splits the first data column into a plurality of first subsets of rows, each of the first subsets of rows being correlated with a distinct processing unit from the multiple processing units, wherein each of the first subsets of rows are handled by processing units that differ from one another;
providing at least a second partitioning of the second data column, wherein said at least the second partitioning splits the second data column into a plurality of second subsets of rows, each of the second subsets of rows being correlated with a distinct processing unit from the multiple processing units, wherein each of the second subsets of rows are handled by processing units that differ from one another;
estimating cardinalities of sub-tables derived by a respective joining of a subset of rows of the first data column and a subset of rows of the second data column which are processed by a same processing unit from the multiple processing units, wherein the cardinalities of the sub-tables describe a quantity of rows in the sub-tables, and wherein the cardinalities of the sub-tables derived by the respective joining of the subset of rows of the first data column and the subset of rows of the second data column are estimated according to:

$$F(a, b) = \sum_{i=0}^{n-1} \left( \frac{\max\left(\int_{x_i}^{x_{i+1}} f(x)dx, 0\right)}{u_1^i} * \frac{\max\left(\int_{x_i}^{x_{i+1}} g(x)dx, 0\right)}{u_2^i} \right) * \max(u_1^i, u_2^i)$$

where $x_0 = a$;
$x_n = b$;
$x_i \in [a,b]$;
f(x) is a density distribution function of a first data column R;
g(x) is a density distribution function of a second data column S;
a, b are a starting row and end row of respective columns R and S which are incorporated into a join;
$U_1^i$ is a number of unique values of the first data column R in a respective interval i;
$U_2^i$ is a number of unique values of the second data column S in the respective interval i;
F(a,b) is an estimated number of rows of a resulting joined table T by joining the first and second data columns R, S in an interval [a,b];

$$\frac{\max\left(\int_{x_i}^{x_{i+1}} f(x)dx, 0\right)}{u_1^i}$$

represents an average number of rows per unique value in an $[x_i;x_{i+1}]$-section for the first data column R;

$$\frac{\max\left(\int_{x_i}^{x_{i+1}} g(x)dx, 0\right)}{u_2^i}$$

represents an average number of rows per unique value in the $[x_i;x_{i+1}]$-section for the second data column S; and
max $(U_1^i, U_2^i)$ is used to derive a maximum value of numbers of unique values contained in $[x_i;x_{i+1}]$-sequences of the first and second data columns R, S; and optimizing an order of execution of multiple join operations based on the estimated cardinalities of the sub-tables, wherein optimizing the order of execution of the multiple join operations avoids intermediate data skew by joining sub-tables having quantities of rows that have a same value by joining sub-tables having quantities of rows that have a same value.

16. The computer program product according to claim 15, wherein a spread of estimated cardinalities of the sub-tables is evaluated for optimizing the order of execution of multiple join operations.

17. The method according to claim 1, further comprising:
identifying, by one or more processors, the frequency of attribute values for the subset of rows of the first data column and the subset of rows in the second data column using sampling of data from the first data column and the second data column.

18. The method according to claim 1, further comprising:
identifying, by one or more processors, all rows in a column in the database system that store a same attribute value; and
merging, by one or more processors, all rows in the column in the database system that store the same attribute value in a same processing unit.

* * * * *